UNITED STATES PATENT OFFICE.

ADOLPH WACK, OF BELLEVILLE, NEW JERSEY, ASSIGNOR TO VERONA CHEMICAL COMPANY, OF NEWARK, NEW JERSEY, A CORPORATION OF NEW JERSEY.

PROCESS OF MAKING CAMPHOR.

No. 898,943.

Specification of Letters Patent.

Patented Sept. 15, 1908.

Original application filed July 2, 1907, Serial No. 381,835. Divided and this application filed December 27, 1907. Serial No. 408,331.

*To all whom it may concern:*

Be it known that I, ADOLPH WACK, a subject of the Emperor of Germany, residing at Belleville, county of Essex, and State of New Jersey, have invented new and useful Improvements in the Manufacture of Camphor, of which the following is a specification.

This invention relates to the production of camphor and this application is a division of my U. S. Patent application Serial No. 381,835, filed July 2, 1907. In the former application the right to claim the manufacture of camphor therein referred to was reserved for another application. The present application is made to claim such manufacture of camphor.

Now, I have discovered that when certain substances, which are primary aromatic amino substances inclusive of their salts, their sulfo-acids and salts thereof, are mixed with the material to be oxidized to form camphor, the amount of the latter which is produced upon oxidation of the mixture is greater than when such primary aromatic amino substances (hereinafter generically termed primary aromatic amino substances) are not employed.

Among the primary aromatic amino substances which I have employed in the practice of this, my invention are: anilin; anilin sulfo acid, particularly the para-variety thereof; naphthylamin, particularly the alpha-variety thereof and naphthylamin sulfo acid particularly the 1.naphthylamin.4.sulfo acid variety thereof. These may be employed as free base, free acid or salt of base or salt of acid without materially affecting the result. The oxidizing agents which have been found to be most favorably influenced thereby are the acid oxidizing agents and particularly such as produce no undissolved material in the course of their action and more particularly sodium bichromate and sulfuric acid or chromic acid and acetic acid, or any of their well-known equivalents. Other modes of oxidation, for example, such as employ a permanganate in acid, alkaline or neutral condition, or electrolytic methods of oxidation or such as involve the use of ozone also have the percentage amount of aromatic carbonyl derivative produced by them favorably affected by the addition of the aforementioned aromatic amino-substance to the material to be oxidized.

The initial material to be oxidized into camphor may be of any of the materials suitable for the production of camphor such as, for example, borneol, inclusive of its esters especially its acetic acid esters, iso-borneol, inclusive of its esters especially its acetic acid ester all of which are hereinafter generically referred to as borneol compound.

The following example will serve as a practical illustration of a way in which my invention may be practiced but I, of course, do not regard my invention as limited to the exact quantities, proportions or conditions set forth since these may be varied within wide limits without departing from my invention and because the favorable influence of my invention is discernible in all ordinary conditions of proportion, quantities and strengths. The parts are by weight:

*Preparation of camphor.*—Dissolve fifty (50) parts of isoborneol in one hundred (100) parts of benzol; intimately mix therewith a solution of fifteen (15) parts of sulfanilic acid in five hundred (500) parts of water: heat this mixture in a vessel provided with a return condenser to the boiling point of the benzol and while stirring the mixture thoroughly add continuously a mixture made up of one hundred (100) parts of sodium bichromate two hundred (200) parts of water and one hundred (100) parts of sulfuric acid of ninety-five per cent. (95%) $H_2SO_4$ in such a manner that this addition requires but one hour, then continue the heating for about ten minutes longer then separate and remove the benzol layer; remove the benzol by suitable distillation; the residue is the desired product. In practice in this manner forty-nine (49) parts of camphor have been obtained and which without further purification possesses a melting point of one hundred and seventy-five (175°) to one hundred and seventy-six (176°) degrees centigrade.

Now what I claim is:

1. The improvement in the manufacture of camphor which consists in submitting a mixture containing a borneol compound and a hereinbefore defined primary aromatic amino substance to oxidation.

2. The improvement in the manufacture of camphor which consists in submitting a mixture of isoborneol and sulfanilic acid to oxidation.

In testimony whereof I have hereunto set my hand in the presence of two subscribing witnesses.

ADOLPH WACK.

Witnesses:
JOHN A. YOUNG,
JOHN J. CONNELL.